United States Patent
Sun et al.

(10) Patent No.: US 7,496,297 B2
(45) Date of Patent: Feb. 24, 2009

(54) LED SYSTEM FOR ILLUMINATION AND DATA TRANSMISSION

(75) Inventors: Xiaohong Sun, Briarcliff Manor, NY (US); Demetri J. Giannopoulos, Norwalk, CT (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 489 days.

(21) Appl. No.: 10/560,018

(22) PCT Filed: Jun. 3, 2004

(86) PCT No.: PCT/IB2004/001854

§ 371 (c)(1), (2), (4) Date: Dec. 8, 2005

(87) PCT Pub. No.: WO2004/109956

PCT Pub. Date: Dec. 16, 2004

(65) Prior Publication Data

US 2006/0273985 A1 Dec. 7, 2006

Related U.S. Application Data

(60) Provisional application No. 60/477,220, filed on Jun. 10, 2003.

(51) Int. Cl.
*H04B 10/04* (2006.01)
*H04B 10/12* (2006.01)
*F21S 8/10* (2006.01)

(52) U.S. Cl. .................. 398/182; 398/197; 362/545; 362/555; 362/612; 345/46; 345/82

(58) Field of Classification Search ................ 398/182, 398/193, 197; 362/612, 611, 613, 555, 543, 362/544, 545, 227, 228, 230, 231; 340/815.45; 345/46, 82; 326/82; 315/313
See application file for complete search history.

(56) References Cited

U.S. PATENT DOCUMENTS

| 3,900,404 | A | | 8/1975 | Dachs |
| 4,320,388 | A | * | 3/1982 | McCarthy et al. .......... 340/10.1 |
| 4,887,074 | A | | 12/1989 | Simon et al. |

(Continued)

FOREIGN PATENT DOCUMENTS

WO  WO 01/07026 A1  5/1991

OTHER PUBLICATIONS

Patent Abstracts of Japan, "Optical Transmission Module", publication No. 2002-111120, Publication Date Dec. 4, 2002, Inventor, Hirobumi.

*Primary Examiner*—M. R. Sedighian

(57) ABSTRACT

A LED system (100) for illumination and data transmission employs a LED driver (110), an electronic switch (130), and an illumination unit (150). In a first illumination state, illumination unit (150) receives LED current(s) from LED driver (110) to emit a first light output. In a second illumination state, the illumination unit (150) receives additional LED current(s) from LED driver 110 via the electronic switch as controlled by the LED driver where the illumination unit (150) additionally emits a second light output. LED system (100) optically communicates a data bit with each transition of the illumination unit (150) from the first illumination state to the second illumination state, and vice-versa.

14 Claims, 3 Drawing Sheets

U.S. PATENT DOCUMENTS

| | | |
|---|---|---|
| 4,955,081 A | 9/1990 | Takahashi |
| 5,657,145 A | 8/1997 | Smith |
| 5,777,772 A * | 7/1998 | Araki ......................... 398/182 |
| 5,838,116 A | 11/1998 | Katyl et al. |
| 6,144,222 A | 11/2000 | Ho |
| 6,198,230 B1 | 3/2001 | Leeb et al. |

* cited by examiner

LED SYSTEM FOR ILLUMINATION AND DATA TRANSMISSION

CROSS REFERENCE TO RELATED APPLICATION

This application claims the benefit of U.S. provisional application Ser. No. 60/477,220, filed Jun. 10, 2003, which the entire subject matter is incorporated herein by reference.

In general, the invention relates to light source data transmission. More specifically, the invention relates to a method and system for transmitting data utilizing a light emitting diode ("LED") light source and light output modulation.

Most artificial light is produced utilizing a lamp in which an electric discharge through a gas is used to produce illumination. One such lamp is the fluorescent lamp. The prevalence of electric discharge illumination has lead to the utilization of discharge lamps for data transmission via light output modulation, such as, for example, dimming control applications.

Another method of creating artificial light includes the use of a LED. An LED provides a radiant flux (light output) proportional to its forward current. Unfortunately, utilizing LEDs for data transmission has proven to be difficult. An LED can be driven in a number of methods, such as, for example direct current ("DC") driving, alternate current ("AC") driving, or pulse driving methodologies.

The DC driving method includes driving an LED using a constant power source, such as, for example a current source. Due to LED characteristics, current sources are the preferred driving power source. Generally, a maximum DC forward current is specified for an LED based on parameters provided by a manufacturer. When driving an LED, the maximum DC forward current can be applied to the LED on a continuous basis. Therefore, DC driving is a preferred method for artificial light generation compared to other methods of light generation described below. Unfortunately, a large forward current results in self-heating of the LED. The heating causes a deterioration of the LED light-emitting efficiency.

The AC driving scheme includes an AC signal that drives the LED. Because an LED conducts in one direction only, a fixed bias is added on top of the AC current in order to drive the LED with a continuous modulated signal. The fixed bias is less than the maximum DC current to prevent overdriving of the LED from the AC modulating current. Therefore, the AC driving scheme results in a sacrifice of maximum power output due to the maximum DC current not being utilized.

The pulse driving method, characterized by the duty cycle and frequency of the pulse, utilizes a relatively larger forward current without associated heating problems within the LED. A larger than maximum allowed DC current can be applied without heating the LED. The resulting large radiant flux during the current conducting period of the pulse driving method facilitates the detection of changes in the LED generated light.

Pulse driving is a preferred method for data transmission applications because it is easier for optical receivers to detect LED light output variations at the rising and falling edges of pulses. Unfortunately, maximum average current in an LED using pulse driving is lower than maximum LED DC current utilizing a DC driving method.

A form of the present invention is a LED system for illumination and data transmission employs a LED driver, an electronic switch and an illumination unit. The illumination unit includes one or more LED light sources for emitting a first light output in response to a flow of LED current(s) from the LED driver through the LED light source(s). The illumination unit includes one or more additional LED light sources for emitting a second light output in response to a flow of additional LED current(s) from the LED driver through the additional LED light source(s). The LED driver controls the electronic switch to either facilitate or impede the flow of additional LED current(s) from the LED driver through the additional LED light source(s).

A second form of the present invention is a method for operating a LED system for illumination and data transmission. The LED system is transitioned between a first illumination state for outputting a first light output, and a second illumination state for outputting the first light output and a second light output. Data bits are communicated by a transition of the illumination unit from the first illumination state to the second illumination state, and vice-versa.

The foregoing form as wells as other forms, features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

Figure 1:
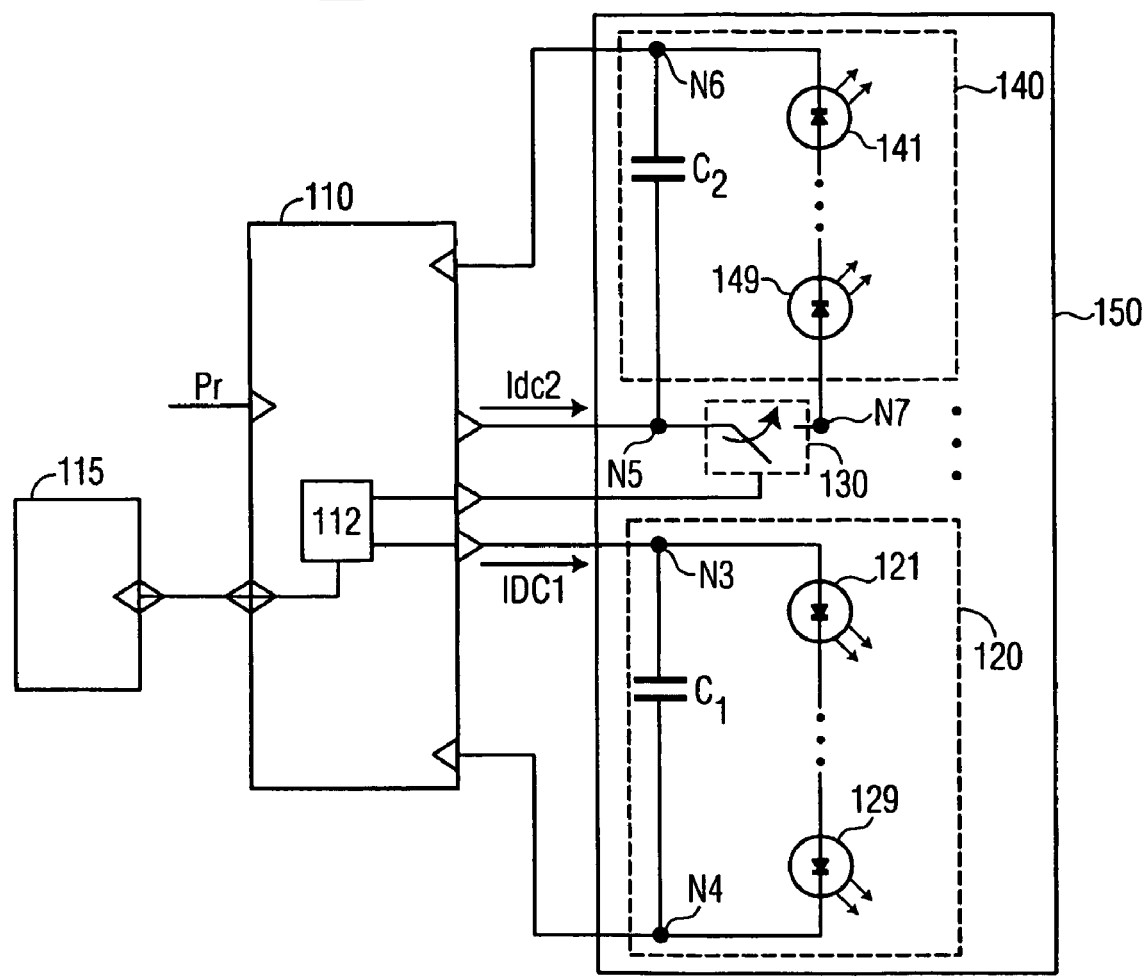
FIG. 1 illustrates a schematic diagram a LED system for illumination and data transmission in accordance with one embodiment of the present invention.

FIG. 1 illustrates a LED system 100 for illumination and data transmission. In FIG. 1, LED system 100 includes LED driver 110, processor 115, and illumination unit 150. Illumination unit 150 includes LED light source circuit 120, electronic switch 130, and LED light source circuit 140. Nodes $N_3$-$N_7$ are illustrated to aide in a description of LED driver 110. LED light source circuit 120 and LED light source circuit 140 are located relative to each other so that light output from both circuit is perceived by an observer as a single-source light from unit 50.

LED driver 110 includes controller 112, main power supply terminal Pwr, input/output data terminal Data1, first output power supply terminal Out1, first input power supply terminal In1, second output power supply terminal Out2, second input power supply terminal In2, and output signal terminal SIG. Controller 112 is coupled between input/output data terminal Data1 and output signal terminal SIG. First output power supply terminal Out1 is coupled to node $N_3$, first input power supply terminal In1 is coupled to node $N_4$, second output power supply terminal Out2 is coupled to node $N_5$, and second input power supply terminal In2 is coupled to node $N_6$.

In one embodiment, LED driver 110 is implemented as a switched-mode LED driver. In an example, LED driver 110 is implemented as an off-line switched-mode power supply to minimize losses resulting from conversion of AC main voltage to low DC voltage across the LED loads. In this embodiment, LED driver 110 includes controller 112 that sends/receives data via input/output data terminal Data1 to/from processor 115 via input/output data terminal Data2. Controller 112 produces a control signal based on the received data.

In another embodiment, LED driver 110 excludes a controller. In this embodiment, a separate controller (not shown) is coupled between processor 115 and electronic switch 130. The separate controller sends/receives data from processor 115 and produces a control signal based on the received data. In yet another embodiment, light source 100 excludes a processor. In this embodiment, the controller as configured in one of the above embodiments receives data from and sends data to the processor (not shown) and produces a control signal based on the received data.

LED light source circuit 120 includes one or more light emitting diodes 121-129, and non-linear device $C_1$. In one embodiment, non-linear device $C_1$ is implemented as a capacitor. Capacitor $C_1$ includes a first terminal and a second terminal. The first terminal of capacitor $C_1$ is coupled to node $N_3$ and the second terminal of capacitor $C_1$ is coupled to node $N_4$. One or more light emitting diodes 121-129 are coupled in series to node $N_3$ and node $N_4$. The LEDs 121-129 are coupled so that a first direct current Idc1 flows from output power supply terminal Out1, of LED driver 110, through the one or more LEDs 121-129 to input power supply terminal In1.

In one embodiment, a single LED 121 is utilized. LED 121 includes a first terminal that is coupled to node $N_3$ and a second terminal that is coupled to node $N_4$. In another embodiment, a plurality of LEDs 121-129 are coupled in series and/or parallel between nodes $N_3$ and $N_4$ so as to allow the first direct current Idc1 to flow from output power supply terminal Out1 of LED driver 110 to input power supply terminal In1 of LED driver 110.

In yet another embodiment, illumination unit 150 of light source 100 includes additional LED light source circuits (not shown). In this embodiment, each additional LED light source circuit includes substantially similar components and is constructed in a substantially similar configuration as LED light source circuit 120. In an example, illumination unit 150 includes additional LED light source circuits coupled to LED light source circuit 120 in a series configuration. In this example, the series configuration allows LED driver 110 to provide current from output power supply terminal Out1 through the LED light source circuits to input power supply terminal In1. In another example, illumination unit 150 includes additional LED light source circuits coupled to LED driver 110 in a parallel configuration. In this example, LED driver 110 is modified to include additional output power supply terminals and input power supply terminals required to supply current to the additional LED light source circuits.

Electronic switch 130 includes a first terminal coupled to node $N_5$, a second terminal coupled to node $N_7$, and an input signal terminal (not detailed) coupled to output signal terminal SIG. Electronic switch 130 can be implemented as any suitable switching circuit, such as, for example a PROM, an EPROM, a microprocessor, a digital logic circuit such as a MOSFET circuit, and the like. In operation, electronic switch 130 receives a control signal and operates (opens/closes) to allow current to flow from LED driver 110 to LED light source circuit 140 based on the received control signal.

In one embodiment, electronic switch 130 includes a default position. In an example, the default position for electronic switch 130 is a closed position. In another example, the default position for electronic switch 130 is an open position. Electronic switch 130 provides a modulated power signal to LED light source circuit 140.

LED light source circuit 140 includes one or more light emitting diodes 141-149, and non-linear device $C_2$. In one embodiment, non-linear device $C_2$ is implemented as a capacitor. Capacitor $C_2$ includes a first terminal and a second terminal. The first terminal of capacitor $C_2$ is coupled to node $N_5$ and the second terminal of capacitor $C_2$ is coupled to node $N_6$. One or more light emitting diodes 141-149 are coupled in series to node $N_6$ and node $N_7$. The LEDs 141-149 are coupled so that second direct current Idc2 flows from output power supply terminal Out2, of LED driver 110, through electronic switch 130, when closed, through the one or more LEDs 141-149 to input power supply terminal In2.

In operation, light source 100 transmits data and provides illumination. In an example, LED driver 110 receives data at input/output data terminal Data1 and power at main power supply terminal Pwr. LED driver 110 produces and supplies current to LED light source circuit 120 and LED light source circuit 140 via electronic switch 130. In this example, a DC driving method is utilized to maximize light output of the LED light sources.

LED driver 110 additionally produces and sends a control signal to electronic switch 130. The control signal instructs electronic switch 130 to activate (opens/closes). By activating electronic switch 130 to open and close, a modulated power signal is produced. The control signal is detailed in FIG. 2A, below. The modulated power signal is detailed in FIG. 2B, below.

By controlling the states of electronic switch 130 (open/close), the total radiant flux of the LED load changes between two values. The two values are a high radiant flux value and a low radiant flux value. In one embodiment, modulating the LED current for data transmission results in a minimum reduction of the average current because the light output is proportional to the average current. Additionally, modulating the LED current for data transmission reduces flickering due to the current modulation. In one embodiment and described in FIGS. 2A and 2B below, a bi-phase amplitude modulation method is used. In this embodiment, the bi-phase amplitude modulation method utilizes an average LED current, during transmission of both "0" and "1" bits, of the same value. This implementation results in no visible flickering during data transmission.

Figure 2A:
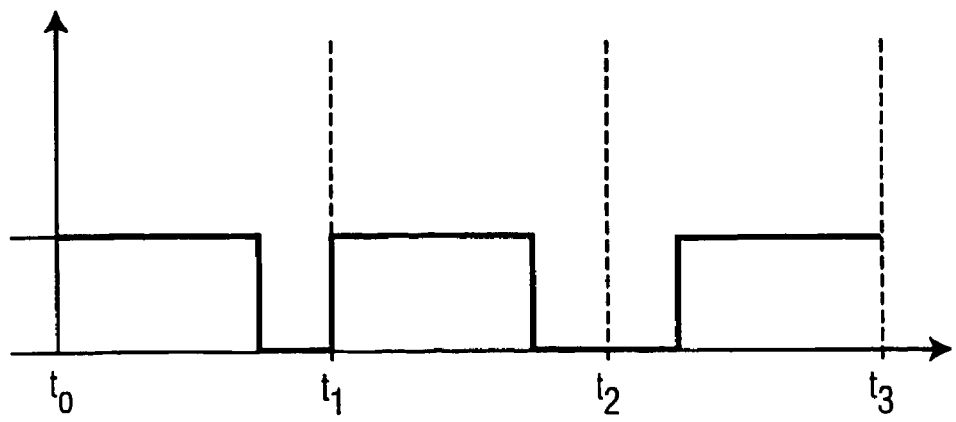
FIG. 2A illustrates an exemplary control signal waveform associated with the LED system illustrated in FIG. 1.

FIG. 2A is a waveform diagram illustrating a control signal waveform produced by a bi-phase amplitude modulation methodology. In FIG. 2A, the x-axis represents time and the y-axis represents a control signal input to a switch. In one embodiment and referring to FIGS. 1 and 2A, the y-axis represents a current input to electronic switch 130, based on a control signal input to electronic switch 130 from output signal terminal SIG of LED driver 110.

Figure 2B:
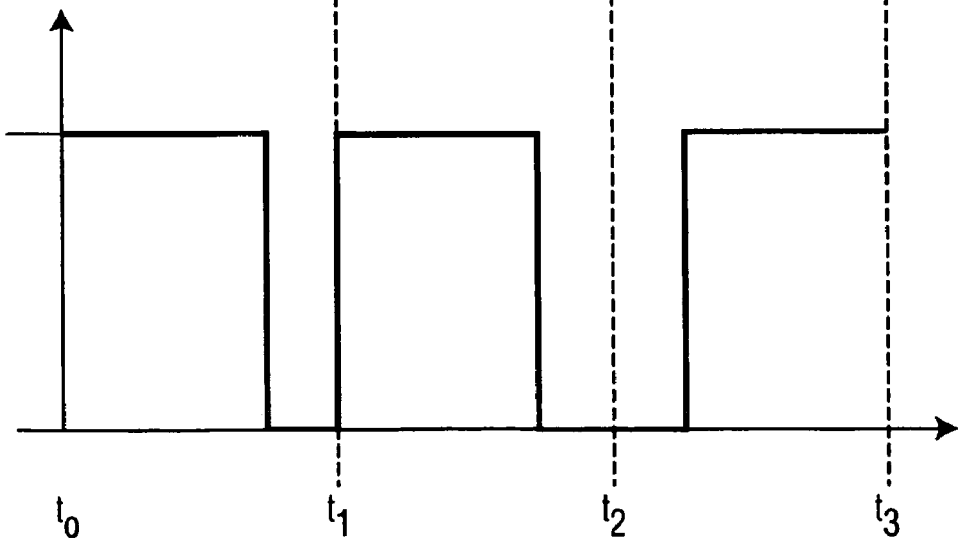
FIG. 2B illustrates an exemplary power signal waveform associated with the LED system illustrated in FIG. 1.

FIG. 2B is a waveform diagram illustrating a power signal waveform produced by a bi-phase amplitude modulation methodology. In FIG. 2B, the x-axis represents time and the y-axis represents a power signal input to an LED light source from a switch. In one embodiment and referring to FIGS. 1 and 2B, the y-axis represents a current input to LED light source circuit 140, for example at node $N_7$, based on a control signal input to electronic switch 130 from output signal terminal SIG of LED driver 110.

In an example and referring to FIG. 1 and FIGS. 2A and 2B, when modulation electronic switch 130 is closed ($SIG_{ON}$) current is allowed to pass to LED light source circuit 140. The increase in current ($P_{ON}$) within the various LED loads causes a corresponding increase in the total radiant flux of illumination unit 150. Conversely, when modulation electronic switch 130 is open ($SIG_{OFF}$) current is not allowed to pass to LED light source circuit 140. The decrease in current ($P_{OFF}$) within the various LED loads causes a corresponding decrease in the total radiant flux of illumination unit 150. By controlling the state of the switch ($SIG_{ON}$, $SIG_{OFF}$) the total radiant flux of the LED load changes between the two values.

The modulation methodology is a bi-phase amplitude modulation methodology. The bi-phase amplitude modulation methodology directly modulates the sum of the currents flowing through the LED devices, which determines the radiant flux, between a high and a low value.

Figure 3A:
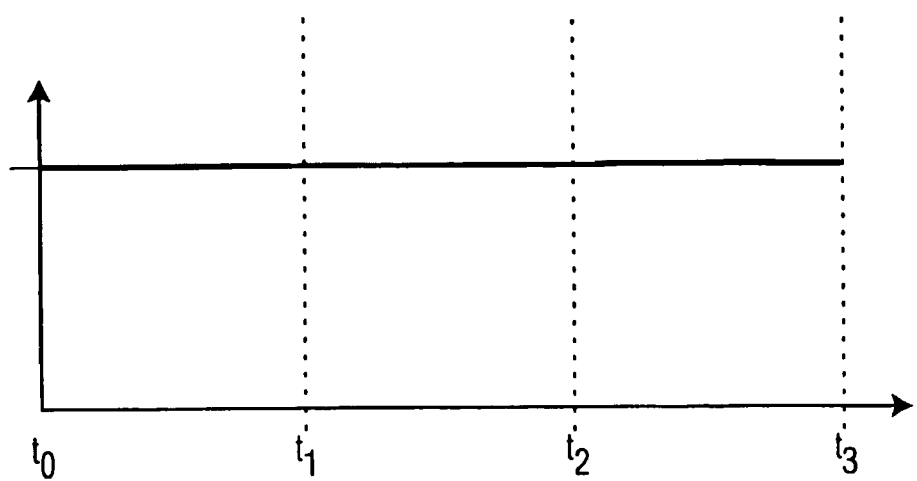
FIG. 3A illustrates an exemplary constant light output associated with the LED system illustrated in FIG. 1.

FIG. 3A is a waveform diagram illustrating an output power level of a portion of the device of FIG. 1. In FIG. 3A, the x-axis represents time and the y-axis represents light output. In one embodiment and referring to FIGS. 1 and 3A, the y-axis represents light output ($P_{HIGH1}$) of LED light source circuit 120 within illumination unit 150.

Figure 3B:
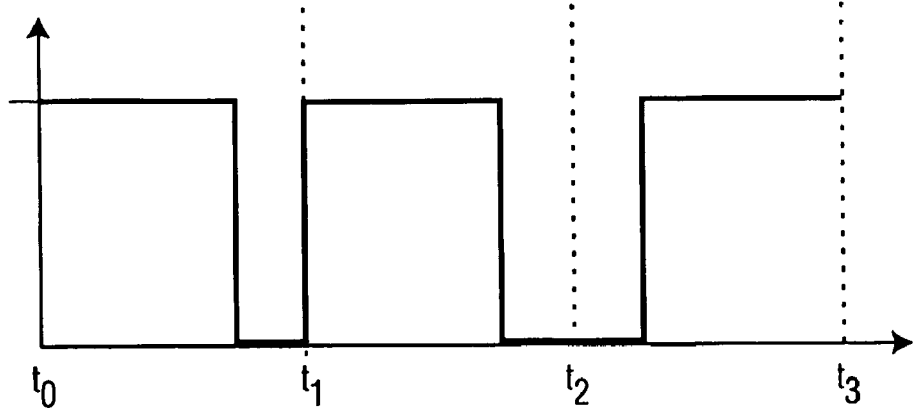
FIG. 3B illustrates an exemplary variable light output associated with the LED system illustrated in FIG. 1.

FIG. 3B is a waveform diagram illustrating an output power level of another portion of the device of FIG. 1. In FIG. 3B, the x-axis represents time and the y-axis represents light output. In one embodiment and referring to FIGS. 1 and 3B, the y-axis represents light output ($P_{HIGH2}$) of LED light source circuit 140 within illumination unit 150.

Figure 3C:
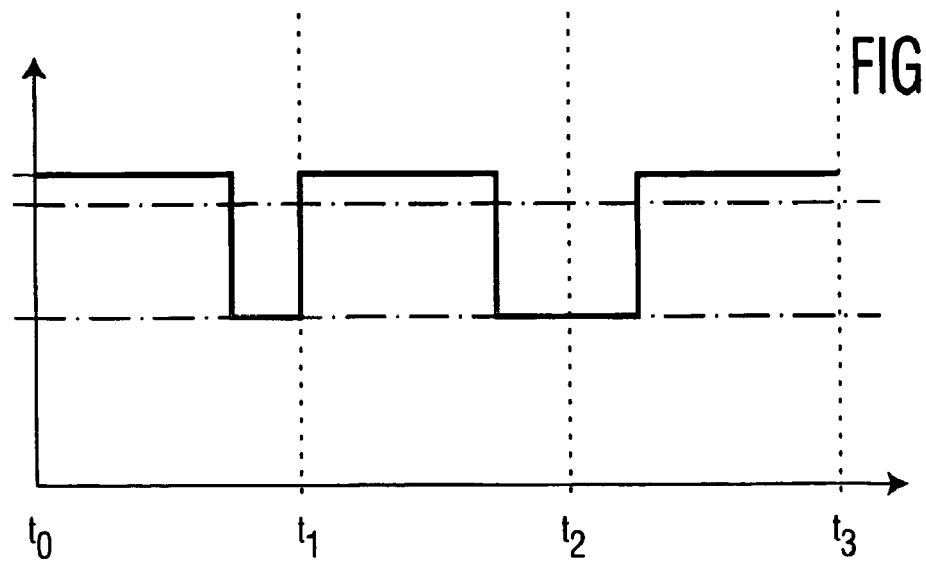
FIG. 3C illustrates an exemplary illumination and data transmission associated with the LED system illustrated in FIG. 1.

FIG. 3C is a waveform diagram illustrating an output power level of the device of FIG. 1. FIG. 3C additionally illustrates various output power levels based on the bi-phase amplitude modulation waveform of FIGS. 3A and 3B. In FIG. 3C, the x-axis represents time and the y-axis represents light output. In one embodiment and referring to FIGS. 1 and 3C, the y-axis represents light output ($P_{HIGH3}$) of illumination unit 150.

In FIG. 3C, $P_{HIGH1}$ represents a light output of LED light source circuit 120 within illumination unit 150, and $P_{HIGH3}$ represents a light output of LED light source circuit 120 and LED light source circuit 140 within illumination unit 150. A transition between a high-to-low flux ($P_{HIGH3}$ to $P_{HIGH1}$) or a transition between a low-to-high ($P_{HIGH1}$ to $P_{HIGH3}$) flux results in a corresponding data bit. In one embodiment, a high-to-low flux ($P_{HIGH3}$ to $P_{HIGH1}$) transition corresponds to a zero (a "0") bit transition, and a low-to-high ($P_{HIGH1}$ to $P_{HIGH3}$) transition corresponds to a one (a "1") bit transition.

In an example and referring to FIG. 3C, the transition from $t_0$ to $t_1$ is a high-to-low ($P_{HIGH3}$ to $P_{HIGH1}$) flux transition and results in a zero (a "0") bit transition. Similarly, the transition from $t_1$ to $t_2$ is a high-to-low flux ($P_{HIGH3}$ to $P_{HIGH1}$) transition and results in a zero (a "0") bit transition. The transition from $t_2$ to $t_3$ is a low-to-high flux ($P_{HIGH1}$ to $P_{HIGH3}$) transition and results in a one (a "1") bit transition.

The bi-phase amplitude modulation method results in substantially similar amounts of average light output ($P_{AVE}$) when transmitting either the zero (a "0") bit or the one (a "1") bit. In one embodiment, substantially similar amounts of average light output ($P_{AVE}$) are achieved by producing substantially similar intervals of high flux during zero (a "0") bit and one (a "1") bit transmissions. In this embodiment, substantially similar intervals of low flux are produced during zero (a "0") bit and one (a "1") bit transmissions as well. The substantially similar amounts of average light output reduce visible flickering.

The bi-phase amplitude modulation method results in a minimization of reduction in light output, proportional to average radiant flux, due to data transmission. In one embodiment, the duration of time the waveform remains high is several times longer than the duration of time the waveform remains low. In this embodiment, light output of the LED load is maximized when used for both illumination and data transmission. That is, light output of the LED load is close to the high flux value when used for both illumination and data transmission. In an example, utilizing a low flux value equal to one-half of a high flux value, and using a high flux period equal to nine times a low flux period results in an average flux equal to 95% of the high flux value.

The present invention may be embodied in other specific forms without departing from its essential characteristics. The described embodiment is to be considered in all respects only as illustrative and not restrictive. Thus, the above-described LED system illustrate one possible embodiment of the present invention for illumination and data transmission, and an actual implementation of the present invention can vary from the system discussed. Moreover, various other improvements and modifications to the present invention may occur to those skilled in the art, and those improvements and modifications will fall within the scope of the present invention as set forth in the claims below.

The invention claimed is:

1. A LED system for illumination and data transmission, said LED system comprising:
   a LED driver operable to provide a control signal and a plurality of LED currents;
   an electronic switch in electrical communication with said LED driver to receive the control signal;
   an illumination unit including a plurality of LED light sources,
   wherein a first at least one LED light source is in electrical communication with said LED driver to facilitate a flow of a first at least one LED current from said LED driver through said first at least one LED light source whereby said first at least one LED light source emits a first light output in response to the flow of the first at least one LED current through said first at least one LED light source,
   wherein a second at least one LED light source is in electrical communication with said electronic switch to facilitate a flow of a second at least one LED current from said LED driver through said second at least one LED light source whereby said second at least one LED light source emits a second light output in response to the flow of the second at least one LED current through said second at least one LED light source, and
   wherein said electronic switch is operable to one of facilitate or impede the flow of the second at least one LED current from said LED driver through said electronic switch and said second at least one LED light source as a function of the control signal.

2. An LED system for illumination and data transmission, said LED system comprising:
   a LED driver operable to provide a control signal and a plurality of LED currents;
   an electronic switch in electrical communication with said LED driver to receive the control signal;
   an illumination unit including a plurality of LED light sources,
   wherein a first at least one LED light source is in electrical communication with said LED driver to facilitate a flow of a first at least one LED current from said LED driver through said first at least one LED light source whereby said first at least one LED light source emits a first light output in response to the flow of the first at least one LED current through said first at least one LED light source,
   wherein a second at least one LED light source is in electrical communication with said electronic switch to facilitate a flow of a second at least one LED current from said LED driver through said second at least one LED light source whereby said second at least one LED light source emits a second light output in response to the flow of the second at least one LED current through said second at least one LED light source, and
   wherein said electronic switch is operable to one of facilitate or impede the flow of the second at least one LED current from said LED driver through said second at least one LED light source as a function of the control signal, wherein said illumination unit switches between a first illumination state and a second illumination state;

wherein the first illumination state is defined by said electronic switch impeding the flow of the second at least one LED current from said LED driver through said second at least one LED light source whereby the first illumination state includes the first light output by said first at least one LED light source and excludes the second light output by said second at least one LED light source; and wherein the second illumination state is defined by said electronic switch facilitating the flow of the second at least one LED current from said LED driver through said second at least one LED light source whereby the second illumination state includes the first light output by said first at least one LED light source and the second light output by said second at least one LED light source.

3. The LED system of claim 2, wherein said LED system optically communicates a first data bit upon each transition of said illumination states from the first illumination state to the second illuminate state; and wherein said LED system optically communicates a second data bit upon each transition of said illumination states from the second illumination state to the first illuminate state.

4. The LED system of claim 1, wherein each said first at least one LED light source includes at least one LED.

5. The LED system of claim 4, wherein each said first at least one LED light source further includes a capacitor.

6. The LED system of claim 1, wherein each said second at least one LED light source includes at least one LED.

7. The LED system of claim 6, wherein each said second at least one LED light source further includes a capacitor.

8. The LED system of claim 1, wherein said first at least one LED light source includes a first LED light source; and wherein said first LED light source includes at least one LED connected in series to said electronic switch.

9. The LED system of claim 8, wherein the series connection of said at least one LED and said electronic switch is connected to said LED driver.

10. The LED system (100) of claim 8, wherein said first LED light source further includes a capacitor connected in parallel to the series connection of said at least one LED and said electronic switch.

11. The LED system of claim 1, wherein said LED driver includes a controller operable to generate the control signal in response to a reception of a data signal indicative of data bit to be optically communicated by said LED system.

12. The LED system of claim 11, wherein said controller is connected to an input signal terminal of said electronic switch.

13. The LED system of claim 1, further comprising: a controller operable to generate the control signal as directed by said LED driver, wherein said LED driver directs said controller to generate the control signal in response to a reception of a data signal indicative of data bit to be optically communicated by said LED system.

14. The LED system of claim 13, wherein said controller is connected to an input signal terminal of said electronic switch.

* * * * *